(12) United States Patent
Masuda

(10) Patent No.: US 6,915,105 B2
(45) Date of Patent: Jul. 5, 2005

(54) LEARNING SYSTEM, LEARNING APPARATUS, AND LEARNING METHOD

(75) Inventor: Akira Masuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 334 days.

(21) Appl. No.: 10/224,083

(22) Filed: Aug. 19, 2002

(65) Prior Publication Data

US 2003/0039950 A1 Feb. 27, 2003

(30) Foreign Application Priority Data

Aug. 21, 2001 (JP) .................................... P2001-250598

(51) Int. Cl.7 ............................................... G09B 3/00
(52) U.S. Cl. .................... 434/350; 434/118; 434/322; 434/323; 434/362
(58) Field of Search .................. 434/118, 219, 434/276, 322, 323, 350, 362, 365; 706/45, 47, 927; 709/204, 223; 703/11; 600/410, 545

(56) References Cited

U.S. PATENT DOCUMENTS

| | | | | |
|---|---|---|---|---|
| 4,835,690 A | * | 5/1989 | Gangarosa et al. | ......... 600/410 |
| 5,722,418 A | * | 3/1998 | Bro | ............................ 600/545 |
| 6,002,915 A | * | 12/1999 | Shimizu | ..................... 434/350 |
| 6,018,730 A | * | 1/2000 | Nichols et al. | ............... 706/45 |
| 6,024,577 A | * | 2/2000 | Wadahama et al. | ......... 434/322 |
| 6,155,840 A | * | 12/2000 | Sallette | ....................... 434/323 |
| 6,160,987 A | * | 12/2000 | Ho et al. | .................... 434/350 |
| 6,162,060 A | * | 12/2000 | Richard et al. | ............. 434/118 |
| 6,246,975 B1 | * | 6/2001 | Rivonelli et al. | ............ 703/11 |
| 6,427,063 B1 | * | 7/2002 | Cook et al. | ................. 434/350 |
| 6,473,794 B1 | * | 10/2002 | Guheen et al. | ............ 709/223 |
| 6,595,781 B2 | * | 7/2003 | Sutton | ........................ 434/276 |
| 6,705,869 B2 | * | 3/2004 | Schwartz | .................... 434/219 |
| 2002/0168620 A1 | * | 11/2002 | Hall et al. | .................. 434/350 |
| 2003/0152904 A1 | * | 8/2003 | Doty, Jr. | ..................... 434/350 |

* cited by examiner

*Primary Examiner*—Joe H. Cheng
(74) *Attorney, Agent, or Firm*—Reed Smith LLP (57) ABSTRACT

The present invention relates to a learning system that makes it possible to obtain an answer quickly with simple operation and thus proceed with learning smoothly. When special explanation is required in learning using a personal computer and a projector in a school, the personal computer is connected to a personal computer or a portable terminal of an expert. The projector on the school side displays a picture of the expert. The personal computer or the portable terminal on the expert side displays a picture of the inside of a classroom. The school side transmits a question item from the personal computer to the expert. The expert transmits an answer to the question item from the personal computer or the portable terminal to the school side. The projector on the school side displays the answer from the expert.

16 Claims, 6 Drawing Sheets

FIG. 2A

ELECTRONICS

PHYSICS
CHEMISTRY
MECHANICAL ENGINEERING
ELECTRICITY
ELECTRONICS
NETWORK
ARCHITECTURE
ENVIRONMENT
SOFTWARE
SPACE ENGINEERING
BIOLOGY
ZOOLOGY
LITERATURE
HISTORY

XXX@YYY.ZZ.COM
45.23.156.1

| SCIENCE | ▼ |
|---|---|
| PHYSICS | ▲ |
| CHEMISTRY | |
| MECHANICAL ENGINEERING | |
| ELECTRICITY | |
| ELECTRONICS | |
| NETWORK | |
| ARCHITECTURE | ☐ |
| ENVIRONMENT | |
| SOFTWARE | |
| SPACE ENGINEERING | |
| BIOLOGY | |
| ZOOLOGY | |
| LITERATURE | ▼ |
| HISTORY | |

| Mr. G | ▼ |
|---|---|
| Mr. A | ▲ |
| Mr. B | |
| Mr. C | |
| Mr. D | |
| Mr. E | |
| Mr. F | |
| Mr. G | ☐ |
| Mr. H | |
| Mr. I | |
| Mr. J | |
| Mr. K | |
| Mr. L | |
| Mr. M | ▼ |
| Mr. N | |

FIG. 5

LEARNING SYSTEM, LEARNING APPARATUS, AND LEARNING METHOD

BACKGROUND OF THE INVENTION

The present invention relates to a learning system, a learning apparatus, and a learning method for presenting learning information to a learner using a computer and the Internet.

In Japan, a plan is being carried out to install at least two personal computers in a regular classroom of every elementary, junior high, and high school (hereinafter referred to as a school) for use of the Internet by 2005. In response to this, while using information on the Internet with personal computers, projectors and the like, an active debate and learning on a subject are already performed in many schools. Such a system will hereinafter be referred to as a learning system.

When conducting a class utilizing information on the Internet with personal computers and the like, as described above, often a difficult question extending over a wide range of fields is encountered which even the teacher cannot answer. An expert system on the Web may be used to get over this situation. However, the expert system is inconvenient when an answer is required on the spot. The expert system also has a disadvantage of requiring much time for preparation because of a need for writing a question in detail, a need for viewing a file currently being read, and the like. Moreover, with line congestion making the connection difficult and the like, an answer is not necessarily obtained instantly, thus preventing smooth proceeding with learning. Thus, with the conventional learning system, it is difficult to quickly obtain an answer to a question during learning, so that proceeding with learning is hindered.

SUMMARY OF THE INVENTION

It is accordingly an object of the present invention to provide a learning system, a learning apparatus, and a learning method that make it possible to obtain an answer quickly with simple operation and thus proceed with learning smoothly.

In order to achieve the above object, according to the present invention, there is provided a learning system comprising: a learning apparatus provided in an actual place of education for requesting special explanation from an outside expert via a network during learning in the actual place of education; and an expert apparatus for giving a special explanation to the learning apparatus via the network in response to the request from the learning apparatus; wherein the learning apparatus presents a learner with the special explanation from the expert apparatus.

Preferably, in the learning system, the learning apparatus may include shooting means for taking a picture of the actual place of education and presenting the picture to the expert apparatus via the network.

Preferably, in the learning system, the learning apparatus may include transmitting means for transmitting learning information used in the actual place of education to the expert apparatus via the network.

Preferably, in the learning system, the learning apparatus may include: connecting information storing means for storing connecting information for connecting the learning apparatus to the expert apparatus; and connecting means for connecting the learning apparatus to the expert apparatus via the network on the basis of the connecting information stored in the connecting information storing means.

Preferably, in the learning system, the expert apparatus may include shooting means for taking a picture of the expert and presenting the picture to the learning apparatus via the network.

Preferably, in the learning system, the learning apparatus and the expert apparatus may each include voice processing means for transmitting and receiving voice information to and from each other via the network.

In addition, in order to achieve the above object, according to the present invention, there is provided a learning apparatus, provided in an actual place of education, for presenting learning information to a learner, the learning apparatus comprising: requesting means for requesting special explanation from an information processing apparatus of an outside expert via a network during learning in the actual place of education; receiving means for receiving a special explanation transmitted from the information processing apparatus of the outside expert via the network in response to the request from the requesting means; and presenting means for presenting the learner with the special explanation received by the receiving means.

Preferably, the learning apparatus may include at least: connecting information storing means for storing connecting information for connecting the learning apparatus to the information processing apparatus of the expert; and connecting means for connecting the learning apparatus to the information processing apparatus via the network on the basis of the connecting information stored in the connecting information storing means.

Preferably, the learning apparatus may include shooting means for taking a picture of the actual place of education and presenting the picture to the information processing apparatus via the network.

Preferably, the learning apparatus may include transmitting means for transmitting learning information used in the actual place of education to the information processing apparatus via the network.

Furthermore, in order to achieve the above object, according to the present invention, there is provided a learning method for presenting learning information to a learner in an actual place of education, the learning method comprising: a requesting step for requesting special explanation from an information processing apparatus of an outside expert via a network during learning in the actual place of education; a receiving step for receiving a special explanation transmitted from the information processing apparatus of the outside expert via the network in response to the request; and a presenting step for presenting the received special explanation to the learner.

Preferably, the learning method may include at least: a connecting information storing step for storing connecting information for making connection to the information processing apparatus of the expert; and a connecting step for making connection to the information processing apparatus via the network on the basis of the connecting information.

Preferably, the learning method may include a shooting step for taking a picture of the actual place of education and presenting the picture to the information processing apparatus of the outside expert via the network.

Preferably, the learning method may include a transmitting step for transmitting learning information used in the actual place of education to the information processing apparatus of the expert via the network.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

A preferred embodiment of the present invention will hereinafter be described with reference to the drawings.

A. Configuration of the Embodiment

Figure 1:
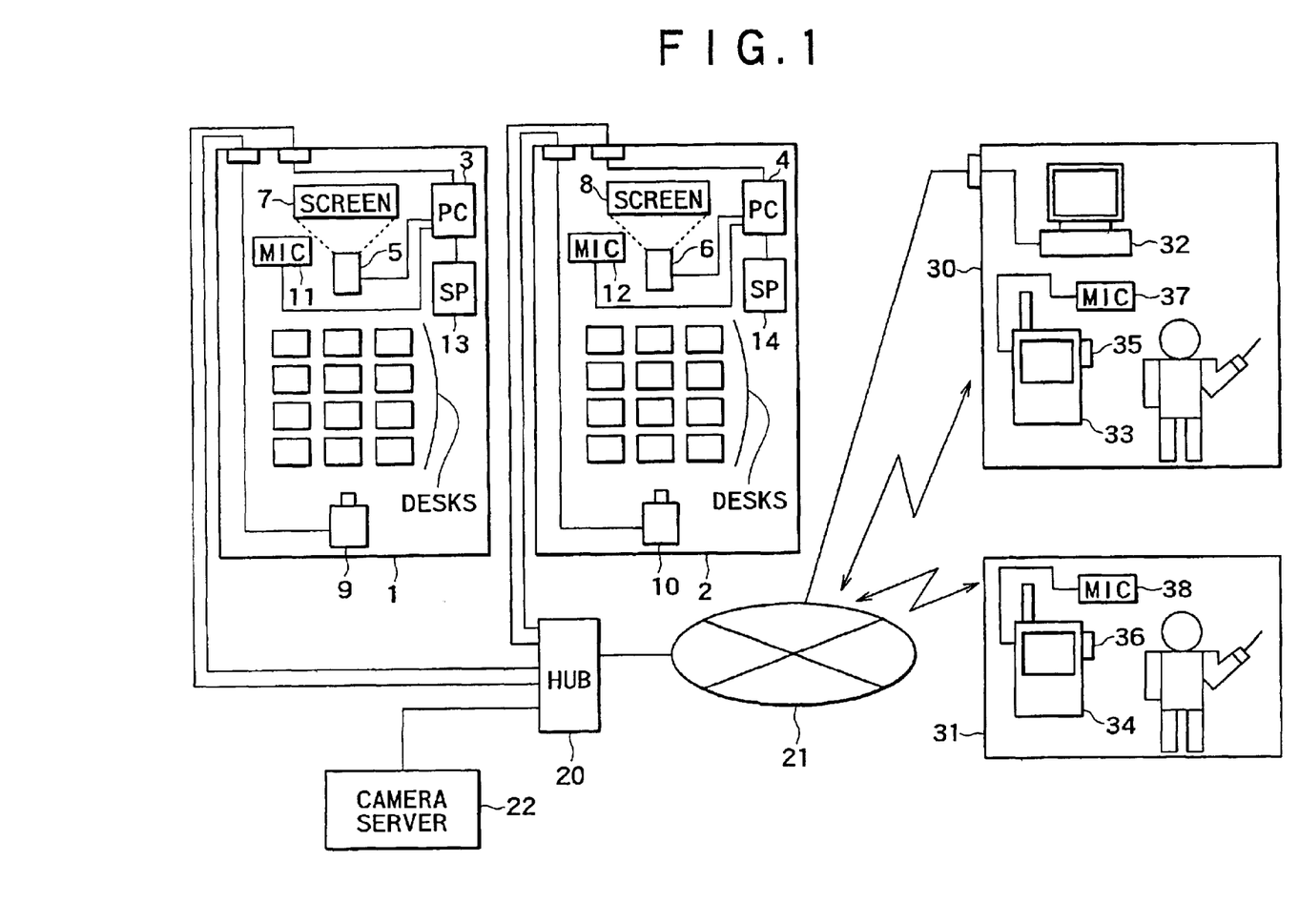
FIG. 1 is a block diagram showing a configuration of a learning system according to an embodiment of the present invention.

FIG. 1 is a block diagram showing a configuration of a learning system according to an embodiment of the present invention. School classrooms 1 and 2 are provided with personal computers 3 and 4, projectors 5 and 6, screens 7 and 8, ISDN-capable cameras 9 and 10, microphones 11 and 12, speakers 13 and 14, and other necessary equipment. The projectors 5 and 6, the microphones 11 and 12, and the speakers 13 and 14 are connected to the personal computers 3 and 4 in the classrooms 1 and 2, respectively. The personal computers 3 and 4 are connected to a network 21 such as the Internet or the like via a hub 20. The personal computers 3 and 4 can obtain information necessary for various learning from a Web server (not shown) on the Internet 21 and project the information on the screens 7 and 8 by the projectors 5 and 6. Also, the personal computers 3 and 4 can project learning software and information necessary for various learning recorded on various media (such as CD-ROM, CD-R, DVD-ROM and the like) onto the screens 7 and 8 by the projectors 5 and 6.

In addition, the personal computers 3 and 4 transmit voice in the classroom (voice of a teacher and voice of learners) picked up by the microphones 11 and 12, respectively, to a personal computer 32 and portable terminals 33 and 34 of experts to be described later via the network 21. The personal computers 3 and 4 also output, from the speakers 13 and 14, voice information obtained from a Web server (not shown) on the Internet 21 and voice information (voice of experts) from the personal computer 32 and the portable terminals 33 and 34 of the experts to be described later.

Each of the personal computers 3 and 4 also stores schedule information of experts to be described later. Experts may be specialists, or persons having some special knowledge and capable of answering questions from a teacher or learners. The personal computers 3 and 4 store preregistered dates and times when experts can respond (or dates and times when experts cannot respond), as schedules of the experts. According to the schedules, the personal computers 3 and 4 selectably show the teacher or the learners personal computers 32 and portable terminals 33 and 34 of experts who can be connected.

The ISDN-capable cameras 9 and 10 are each connected to a camera server 22 of the school via the hub 20, and can show the whole of the classrooms 1 and 2. The camera server 22 transmits pictures from the ISDN-capable cameras 9 and 10 to the personal computer 32 and the portable terminals 33 and 34 of the experts to be described later via the Internet 21.

Rooms 30 and 31 of the experts are provided with the personal computer 32 as a fixed terminal, as required. The personal computer 32 can be connected to the Internet 21, and displays various information from the school side. The various information from the school side includes pictures displayed by the projectors 5 and 6, pictures of the inside of the classrooms which pictures are taken by the ISDN-capable cameras 9 and 10 and transmitted from the camera server 22, and questions from the teacher and the learners (text information, voice information or the like). Also, the personal computer 32 transmits answer information (text information, picture information, voice information and the like) provided by the expert in response to a question from the school side to the personal computer 3 or 4 on the school side via the Internet 21.

The experts carry the portable terminals 33 and 34 because the experts can be in a place where the personal computer 32 as a fixed terminal is not installed. The portable terminals 33 and 34 can be connected to the Internet 21 by radio, and have preset or detachable cameras 35 and 36 and microphones 37 and 38. The cameras 35 and 36 take a picture of the face of the expert, or a picture of the expert answering a question. The microphones 37 and 38 pick up voice of the explaining expert. As with the personal computer 32 described above, the portable terminals 33 and 34 transmit and receive various information (text information, picture information, voice information and the like) to and from the school side.

B. Operation of the Embodiment

Operation of the above-described embodiment will next be described.

Figure 2A:
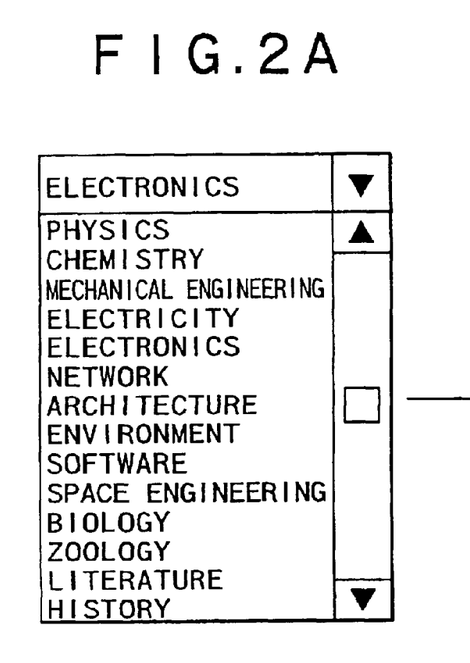
FIGS. 2A, 2B, and 2C are schematic diagrams showing an example of a GUI in registering/deleting the registration of an expert.
Figure 2B:
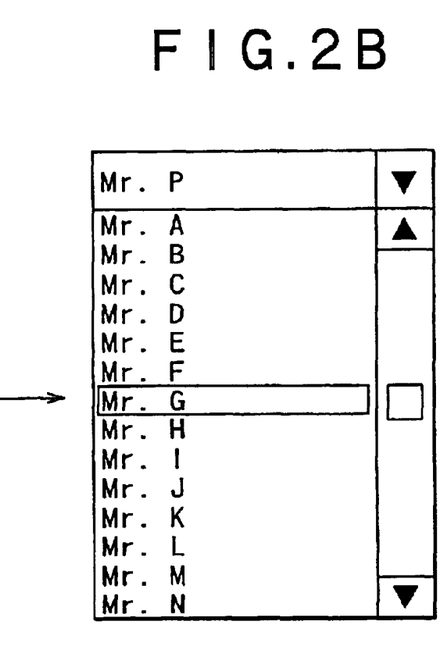
Figure 2C:
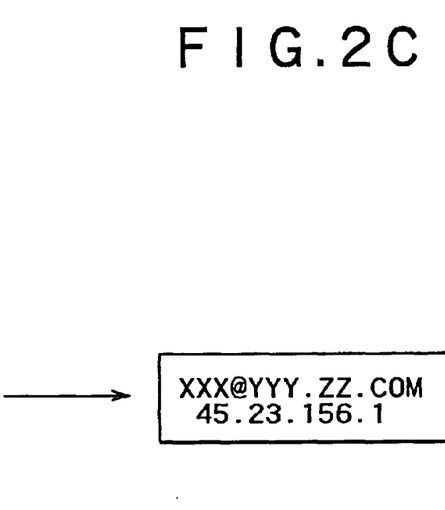

First, operation of registering/deleting the registration of an expert will be described. An administrator (who may be a teacher) on the school side registers/deletes the registration of an expert by GUI software installed in the personal computers 3 and 4. FIG. 2 is a schematic diagram showing an example of a GUI in registering/deleting the registration of an expert. The administrator on the school side first selects a field of specialization of the expert as shown in FIG. 2A, then registers (or selects) a name or the like of the expert as shown in FIG. 2B, and thereafter registers a mail address of the expert, an IP address of the personal computer 32 or the portable terminal 33 or 34 of the expert and the like, as shown in FIG. 2C. The IP address of the expert is allowed to be accessed only by the administrator and protected by a password for security reasons.

Figure 3:
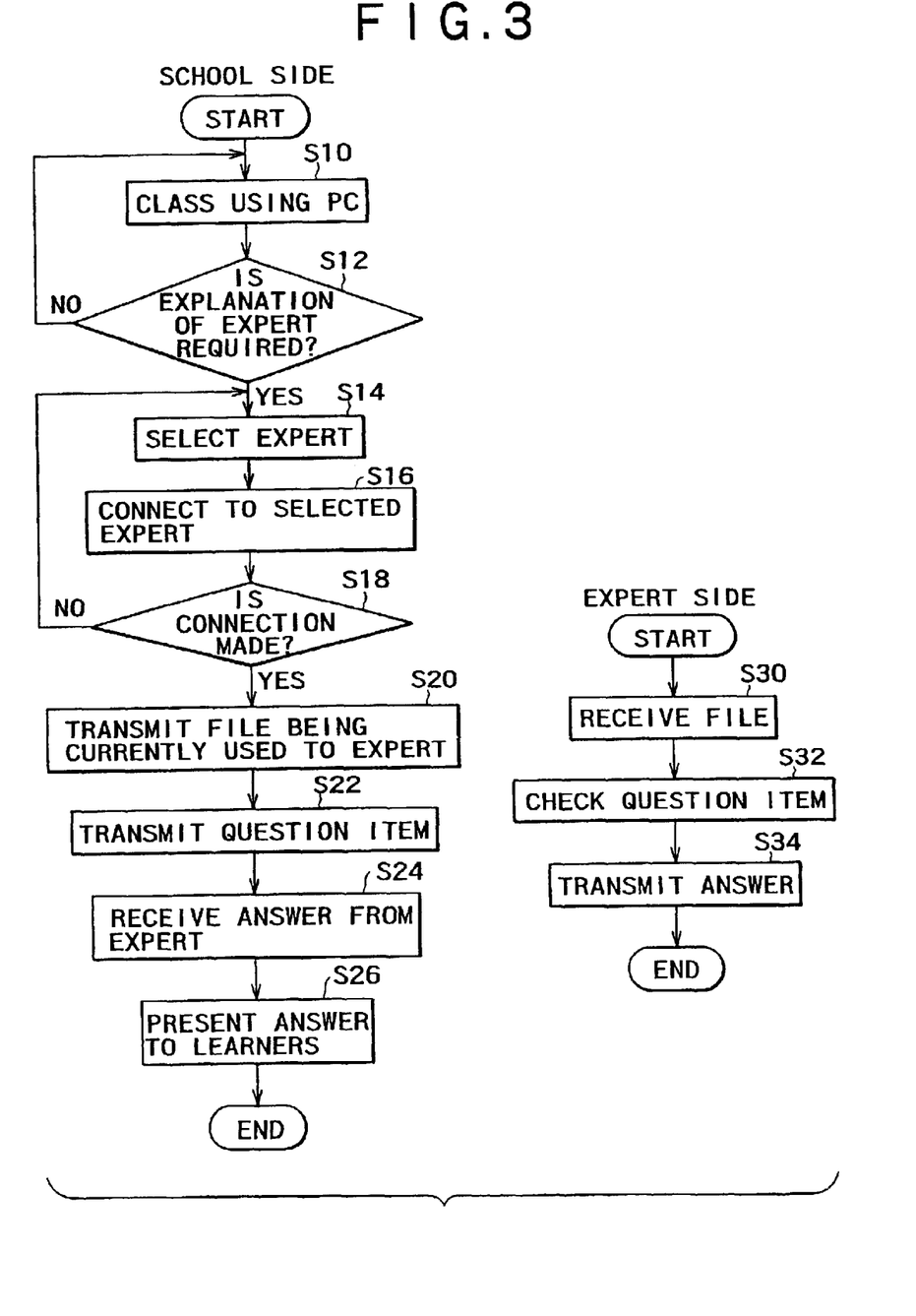
FIG. 3 is a flowchart of assistance in explaining operation of the embodiment.
Figure 4A:
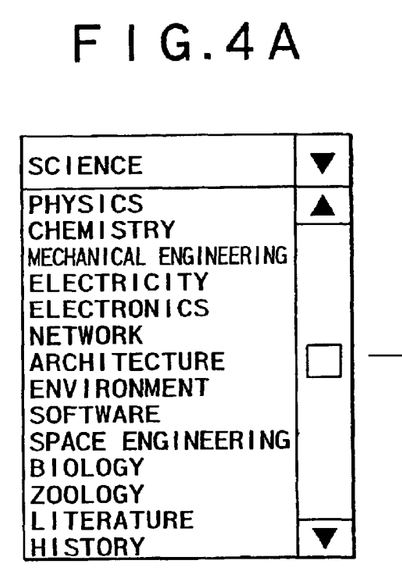
FIGS. 4A and 4B are schematic diagrams showing an example of a GUI in selecting an expert.
Figure 4B:
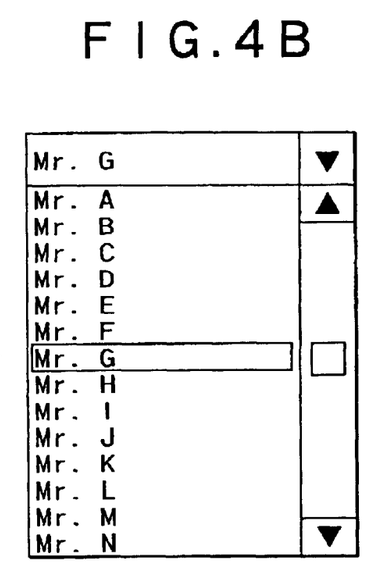

Operation of the embodiment in learning will next be described. FIG. 3 is a flowchart of assistance in explaining the operation of the present embodiment. In the school, a class is conducted using the personal computer 3 or 4, the projector 5 or 6 and the like (step S10). When special explanation is required in learning (step S12), the teacher uses a GUI provided by the personal computer 3 or 4 to select the special field, as shown in FIG. 4A, and then selects a preregistered expert, as shown in FIG. 4B (step S14). The personal computer 3 or 4 is connected to the personal computer 32 or the portable terminal 33 or 34 of the selected expert according to the IP address of the expert (step S16). In this case, when the personal computer 3 or 4 cannot be connected to the personal computer 32 or the portable terminal 33 or 34 of the expert for some reason (step S18), the processing returns to the step S14 to try connecting the personal computer 3 or 4 to the personal computer 32 or the portable terminal 33 or 34 of another expert.

When the personal computer 3 or 4 is connected to the personal computer 32 or the portable terminal 33 or 34 of the expert, the projector 5 or 6 of the school displays on the screen 7 or 8 a picture of the expert which picture is taken by the camera 35 or 36 and transmitted from the portable terminal 33 or 34 of the expert. The personal computer 32 or the portable terminal 33 or 34 of the expert displays a picture of the inside of the school classroom 1 or 2.

When there is for example a file used during the class in the school, the file is transmitted from the personal computer 3 or 4 in the classroom to the portable terminal 33 or 34 or the personal computer 32 of the expert (step S20). Then, the school transmits a question item from the personal computer 3 or 4 to the portable terminal 33 or 34 or the personal computer 32 of the expert (step S22). The question item is transmitted to the portable terminal 33 or 34 or the personal computer 32 of the expert as a file including text and a picture, or is transmitted to the expert by direct conversation using the microphone 11 or 12 in the classroom.

The personal computer 32 or the portable terminal 33 or 34 of the expert receives the file used during the class and the question item (step S30). Then, the expert checks the question item (step S32). The expert thereafter transmits a file including text, a picture and the like to the personal computer 3 or 4 of the school as an answer to the question item, or transmits the answer to the teacher or the learners by direct conversation using the microphone 37 or 38 connected to the portable terminal 33 or 34 (step S34).

On the school side, the answer from the expert is displayed on the screen by the projector 5 or 6, or the answer (voice) from the expert is outputted by the speaker 13 or 14 (step S26). Then, the school and the expert disconnect the line from each other when there are no further questions and answers. The question transmitted to the expert and the answer from the expert is stored in the personal computer 3 or 4 of the school, a server (not shown) on the Internet 21 or the like for later reference in class.

Figure 5:
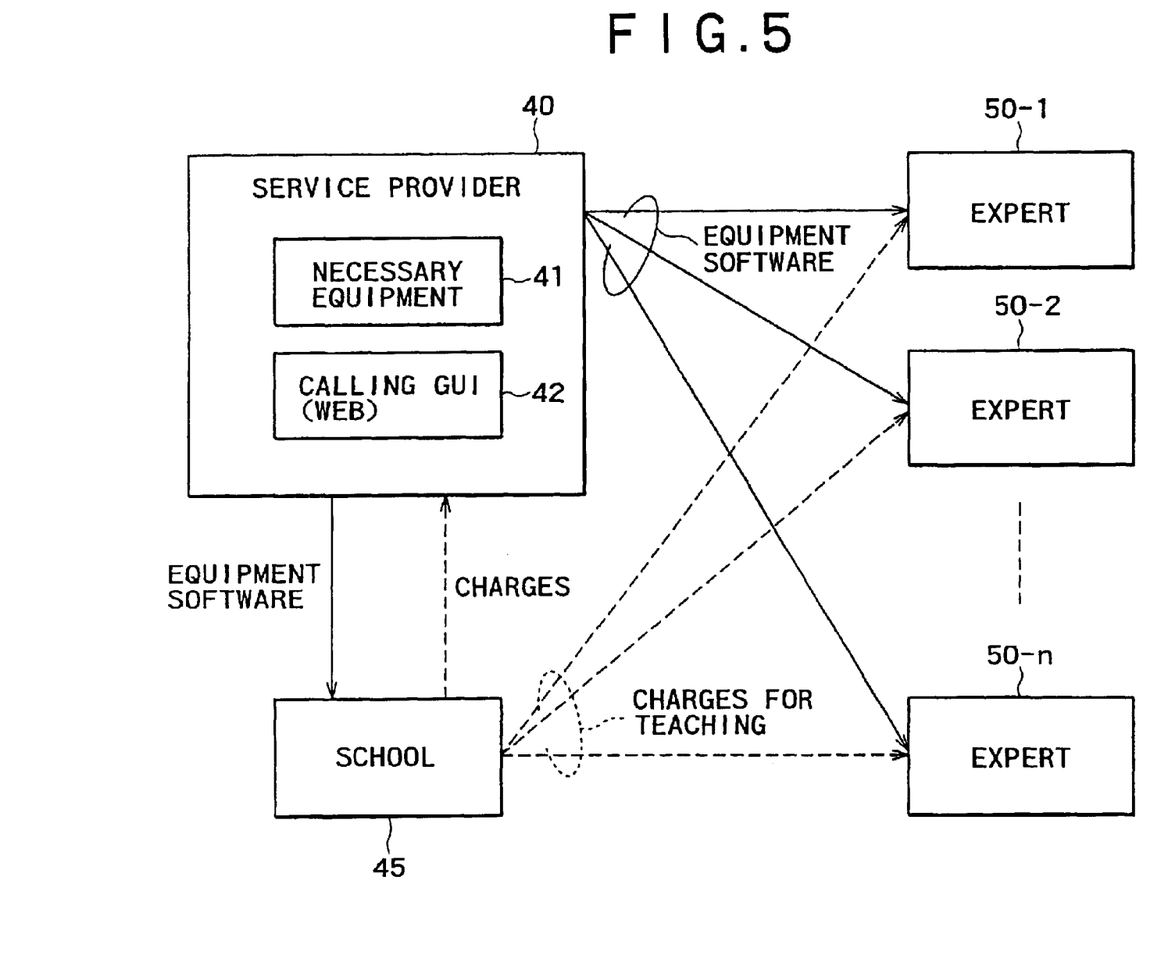
FIG. 5 is a conceptual diagram of assistance in explaining a billing method in managing the learning system.
Figure 6:
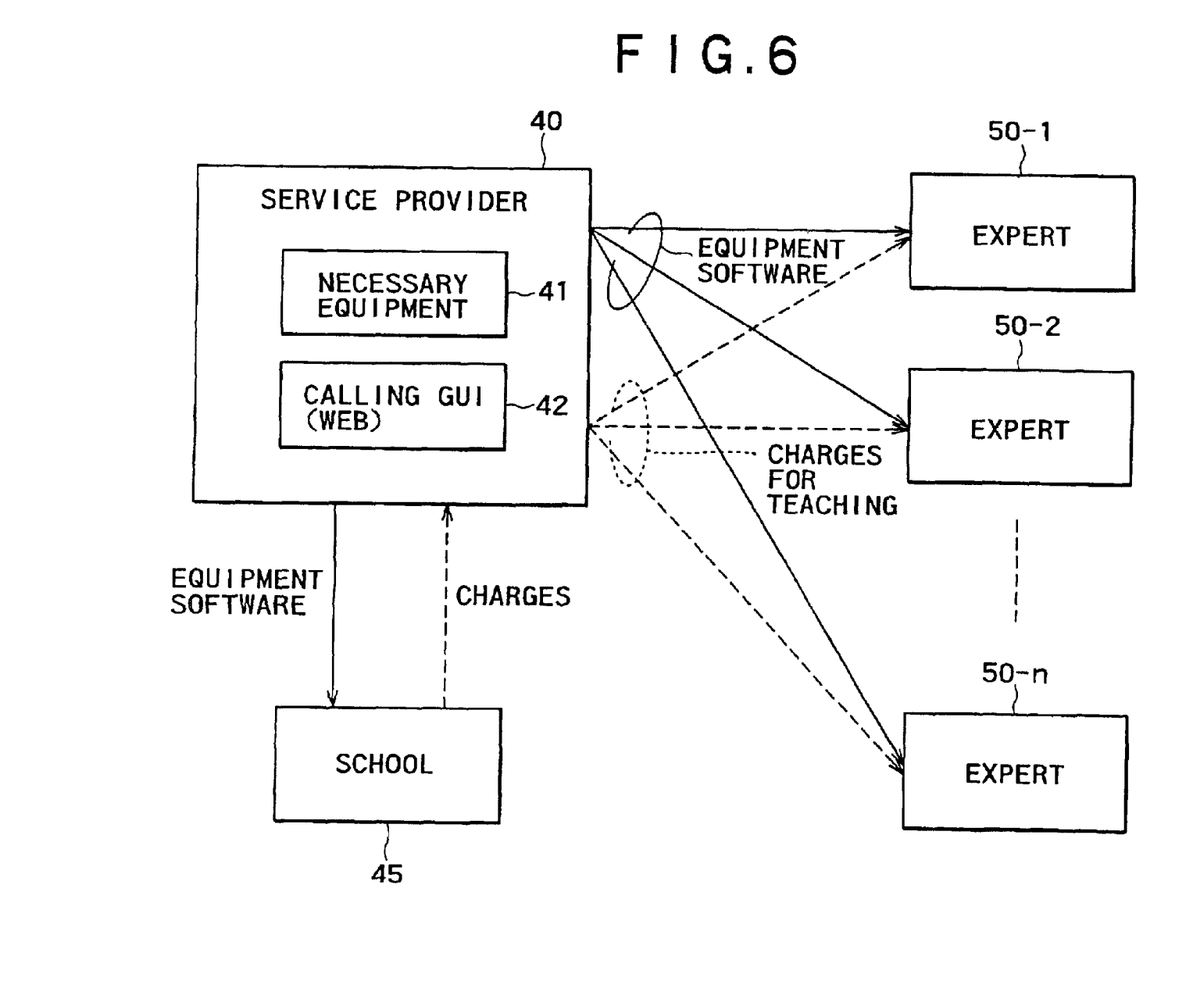
FIG. 6 is a conceptual diagram of assistance in explaining a billing method in managing the learning system.

FIG. 5 and FIG. 6 are conceptual diagrams of assistance in explaining billing methods in managing the above learning system. In an example shown in FIG. 5, a service provider 40 provides equipment 41 necessary for the learning system, calling GUI software (WEB) 42 for calling an expert from the school, and the like to experts 50-1 to 50-n and the school 45. The school 45 pays the service provider 40 a charge for the use of the equipment, a charge for the software, a charge for service and the like. The school 45 also pays the experts 50-1 to 50-n charges for teaching according to the number of answers or the like. In an example shown in FIG. 6, the school 45 pays the service provider 40 a charge for the use of the equipment, a charge for the software, a charge for service, and a charge for teaching by the experts. The service provider 40 pays the experts 50-1 to 50-n the charge for teaching according to the number of answers or the like. In the example shown in FIG. 6, the service provider 40 collectively manages payments to the experts 50-1 to 50-n, thus reducing a burden on the school 45 side.

With the embodiment described above, when a teacher cannot explain or some special explanation is desired during a class, explanation by an expert who is familiar with the subject can be readily obtained, so that the class can proceed smoothly. In this case, the schedule of the expert is known in advance, and therefore it is possible to call the expert efficiently.

Also, even if an immediate answer to a question is not obtained, some kind of reply can be obtained with live voice of the expert. Therefore, interest of the learners can be maintained at least for a short time, thus improving learning effects. It is also possible to reduce a burden on the teacher. In addition, the learning system using a personal computer in an actual place of education such as a school can be readily realized, and therefore be brought into widespread use. Furthermore, a question to an expert and an answer from the expert can be stored in a server or the like to be utilized in later classes.

It is to be noted that while in the foregoing embodiment, the schedules of experts are registered in the personal computers 3 and 4 of the school, the present invention is not limited to this, and the schedules of experts may be registered in a server (Web server, database server or the like) on the Internet 21. By storing the schedules of experts in a server on a wide area network such as the Internet 21, the schedules of experts can be shared with another school or the like. Also, in the foregoing embodiment, an actual place of education is an elementary school, a junior high school, a high school or the like; however, the present invention is not limited to this, and an actual place of education may be any place for learning, such as a cram school, a private room or the like.

Thus, according to a learning system in accordance with the present invention, a learning apparatus provided in an actual place of education requests special explanation from an outside expert via a network during learning in the actual place of education, and presents a learner with a special explanation given from an apparatus of the expert to the learning apparatus via the network. Therefore, it is possible to obtain an answer quickly with simple operation, and thus obtain an advantage of being able to proceed with learning smoothly.

In addition, according to the present invention, a learning apparatus provided in an actual place of education requests special explanation from an information processing apparatus of an outside expert via a network by requesting means during learning in the actual place of education, receives a special explanation transmitted from the information processing apparatus of the outside expert via the network by receiving means, and presents a learner with the special explanation by presenting means. Therefore, it is possible to obtain an answer quickly with simple operation, and thus obtain an advantage of being able to proceed with learning smoothly.

Furthermore, in order to achieve the object mentioned above, according to the present invention, a learning method for presenting learning information to a learner in an actual place of education includes: a requesting step for requesting special explanation from an information processing apparatus of an outside expert via a network during learning in the actual place of education; a receiving step for receiving a special explanation transmitted from the information processing apparatus of the outside expert via the network in response to the request; and a presenting step for presenting the received special explanation to the learner. Therefore, it is possible to obtain an answer quickly with simple operation, and thus obtain an advantage of being able to proceed with learning smoothly.

While a preferred embodiment of the present invention has been described using specific terms, such description is for illustrative purposes only, and it is to be understood that changes and variations may be made without departing from the spirit or scope of the following claims.

What is claimed is:

1. A learning system comprising:

a learning apparatus provided in an actual place of education for requesting special explanation from an outside expert via a network during learning in the actual place of education, the learning apparatus comprising:

schedule storage unit that stores schedule information including dates and times when experts are available;

expert availability module for selectably presenting available experts on the basis of the schedule stored in said schedule storage unit; and an expert apparatus for giving a special explanation to said learning apparatus via the network in response to the request for explanation from said learning apparatus;

wherein said learning apparatus presents a learner with the special explanation from said expert apparatus.

2. A learning system as claimed in claim 1, wherein said learning apparatus includes a camera for taking a picture of the actual place of education and presenting the picture to said expert apparatus via the network.

3. A learning system as claimed in claim 1, wherein said learning apparatus includes a network interface for transmitting learning information used in the actual place of education to said expert apparatus via the network.

4. A learning system as claimed in claim 1, wherein said learning apparatus includes:

a connection unit that stores information for connecting said learning apparatus to said expert apparatus; and a network connection for connecting said learning apparatus to said expert apparatus via the network on the basis of the connecting information stored in said connection unit.

5. A learning system as claimed in claim 1, wherein said expert apparatus includes a camera for taking a picture of the expert and presenting the picture to said learning apparatus via the network.

6. A learning system as claimed in claim 1, wherein said learning apparatus and said expert apparatus each include a voice processing unit for transmitting and receiving voice information to and from each other via the network.

7. The learning system of claim 1, wherein a response from an outside expert via a network automatically creates a charge to a requestor.

8. A learning apparatus, provided in an actual place of education, for presenting learning information to a learner, said learning apparatus comprising:

schedule storage unit that stores schedule information including dates and times when experts are available;

expert availability module for selectably presenting available experts on the basis of the schedule stored in said schedule storage unit;

a request unit that requests special explanation from an information processing apparatus of an available outside expert via a network during learning in the actual place of education;

a receive unit that receives a special explanation transmitted from the information processing apparatus of the outside expert via the network in response to the request from said request unit; and a presentation unit that presents the learner with the special explanation received by said receive unit.

9. A learning apparatus as claimed in claim 8, further including at least:

a connection unit that stores information for connecting said learning apparatus to the information processing apparatus of said expert; and a network connection for connecting said learning apparatus to said information processing apparatus via the network on the basis of the connecting information stored in said connection unit.

10. A learning apparatus as claimed in claim 8, further including a camera for taking a picture of the actual place of education and presenting the picture to said information processing apparatus via the network.

11. A learning apparatus as claimed in claim 8, further a network interface for transmitting learning information used in the actual place of education to said information processing apparatus via the network.

12. A learning method for presenting learning information to a learner in an actual place of education, said learning method comprising:

storing schedule information including dates and times when experts are available;

presenting experts who can be connected on the basis of said stored schedule information;

requesting special explanation from an information processing apparatus of an available outside expert via a network during learning in the actual place of education;

receiving a special explanation transmitted from the information processing apparatus of the outside expert via the network in response to said requesting special explanation; and presenting said received special explanation to the learner.

13. A learning method as claimed in claim 12, further including at least:

storing connecting information for making connection to the information processing apparatus of said expert; and connecting to said information processing apparatus via the network on the basis of said connecting information.

14. A learning method as claimed in claim 13, wherein said connecting step makes connection via the network to an information processing apparatus of an expert selected from said presented experts on the basis of said schedule information.

15. A learning method as claimed in claim 12, further including taking a picture of the actual place of education and presenting the picture to the information processing apparatus of said outside expert via the network.

16. A learning method as claimed in claim 12, further including a transmitting learning information used in the actual place of education to the information processing apparatus of said expert via the network.

* * * * *